United States Patent
Tsai et al.

(10) Patent No.: US 7,974,662 B2
(45) Date of Patent: Jul. 5, 2011

(54) DETACHABLE CONNECTION MECHANISM

(75) Inventors: Tui-Yang Tsai, Tao Yuan Shien (TW);
Chun-Wang Lin, Taipei County (TW);
Yi-Han Shiu, Taoyuan County (TW);
Chia-Wei Lin, Tainan County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 731 days.

(21) Appl. No.: 12/073,390

(22) Filed: Mar. 5, 2008

(65) Prior Publication Data
US 2009/0088227 A1    Apr. 2, 2009

(30) Foreign Application Priority Data

Sep. 29, 2007    (TW) .............................. 96136611 A

(51) Int. Cl.
*H04B 1/38* (2006.01)

(52) U.S. Cl. ................. 455/575.1; 455/90.3; 455/575.4; 455/573; 455/566; 361/679.41; 361/679.56; 361/727; 361/517; 312/223.2; 312/351.6; 312/351.9; 312/351.12

(58) Field of Classification Search .......... None
See application file for complete search history.

(56) References Cited

U.S. PATENT DOCUMENTS

| | | | | |
|---|---|---|---|---|
| 6,002,921 A | * | 12/1999 | Pfahlert et al. | 455/575.9 |
| 7,599,721 B2 | * | 10/2009 | Taki et al. | 455/575.1 |
| 7,719,830 B2 | * | 5/2010 | Howarth et al. | 361/679.41 |

* cited by examiner

*Primary Examiner* — Tuan A Pham
*Assistant Examiner* — Fanghwa Wang
(74) *Attorney, Agent, or Firm* — Rabin & Berdo, PC

(57) ABSTRACT

A detachable connection mechanism is to establish an electrical connection between a mobile phone and a notebook computer. The detachable connection mechanism is designed at a housing board. The housing board has an opening. A load board is pivotally connected with the housing board, and in contact with or away from the housing board in parallel. When the load board is in contact with the housing board, the load board is fitted within the opening. Two rotatable members are pivotally connected with housing board. Several resilient arms are respectively pivotally connected with the housing board at one end and with the load board at the other end. The mobile phone is selectively connected or disconnected with the notebook computer by interacting the rotatable members, movable members, resilient arms and the load board.

20 Claims, 5 Drawing Sheets

US 7,974,662 B2

DETACHABLE CONNECTION MECHANISM

RELATED APPLICATIONS

This application claims priority to Taiwan Application Serial Number 96136611, filed Sep. 29, 2007, which is herein incorporated by reference.

BACKGROUND

1. Field of Invention

The present invention relates to a detachable connection mechanism.

2. Description of Related Art

In current electronic device market, someone has comes up with a rough concept to interrelate a mobile phone with a notebook computer in functions and physical structures. However, there is no specified solution available to detachably couple a mobile phone with a notebook computer properly.

SUMMARY

It is therefore an objective of the present invention to provide a detachable connection mechanism for coupling a mobile phone with a notebook computer.

In accordance with the foregoing and other objectives of the present invention, a detachable connection mechanism is provided. A notebook computer has a housing board with an opening. A load board, which has a magnet, is pivotally connected to a side of the housing board. The load board is substantially in parallel with the housing board when the load board is moved close to or away from the housing board. The load board is substantially fitted within the opening when the load board is moved to couple with the housing board. A mobile phone is attached to the load board by a magnetic attraction of the magnet. Two rotatable members are pivotally connected with the side of the housing board. A substantially M-shaped member is slidably connected with the side of the housing board, and pivotally connected an end of each rotatable member. The substantially M-shaped member is slid relative to the housing board to enable an opposite end of each rotatable member to selectively engage or disengage an edge of the mobile phone. A securing member is coupled with the substantially M-shaped member and simultaneously slid relative to the housing board to selectively engage or disengage an opposite edge of the mobile phone. A plurality of resilient arms are pivotally connected with the side of the housing board at an end, and pivotally connected with the load board at an opposite end. When the securing member disengages the opposite edge of the mobile phone, the substantially M-shaped member is simultaneously slid to enable the opposite end of each rotatable member to disengage the edge of the mobile phone, and the load board is moved by the plurality of resilient arms to couple with the housing board.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
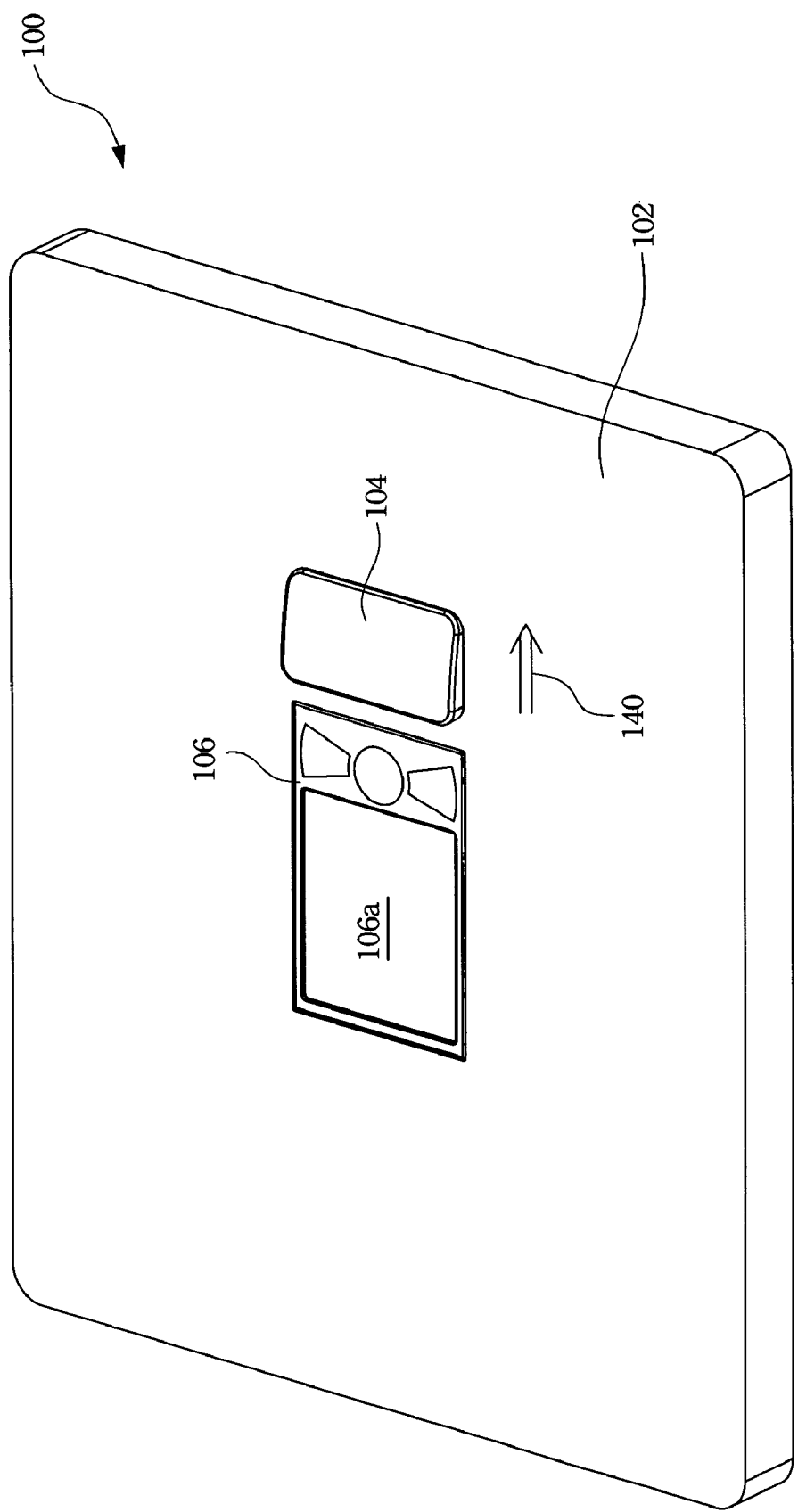
FIG. 1 illustrates a top view of a housing board of a notebook computer according to an embodiment described herein.

Reference will now be made in detail to the present preferred embodiments of the invention, examples of which are illustrated in the accompanying drawings. Wherever possible, the same reference numbers are used in the drawings and the description to refer to the same or like parts.

In present disclosure, a detachable connection mechanism is provided to couple a housing board of first electronic device (such as a notebook computer) with a second electronic device (such as a mobile phone or PDA) such that the second electronic device can be electrically connected with the first electronic device to perform a battery charge (for the battery within the second electronic device) or perform other functions. For the following exemplary embodiments, the first electronic device is referred to a notebook computer and the second electronic device is referred to a mobile phone.

FIG. 1 illustrates a top view of a housing board of a notebook computer according to an embodiment described herein. A detachable connection is designed on a housing board 102 of a notebook computer as well as a mobile phone 106. In FIG. 1, the mobile phone 106 couples with the housing board 102, and an electrical connection is established between thereof such that a display screen 106a of the mobile phone 106 may serve as a second display screen of the notebook computer. When a control button 104 is moved along a direction 140, the mobile phone 106 is lifted out of the housing board 102 and unlocked, users can take the mobile phone 106 away from the housing board 102 (as illustrated in FIG. 2).

Figure 2:
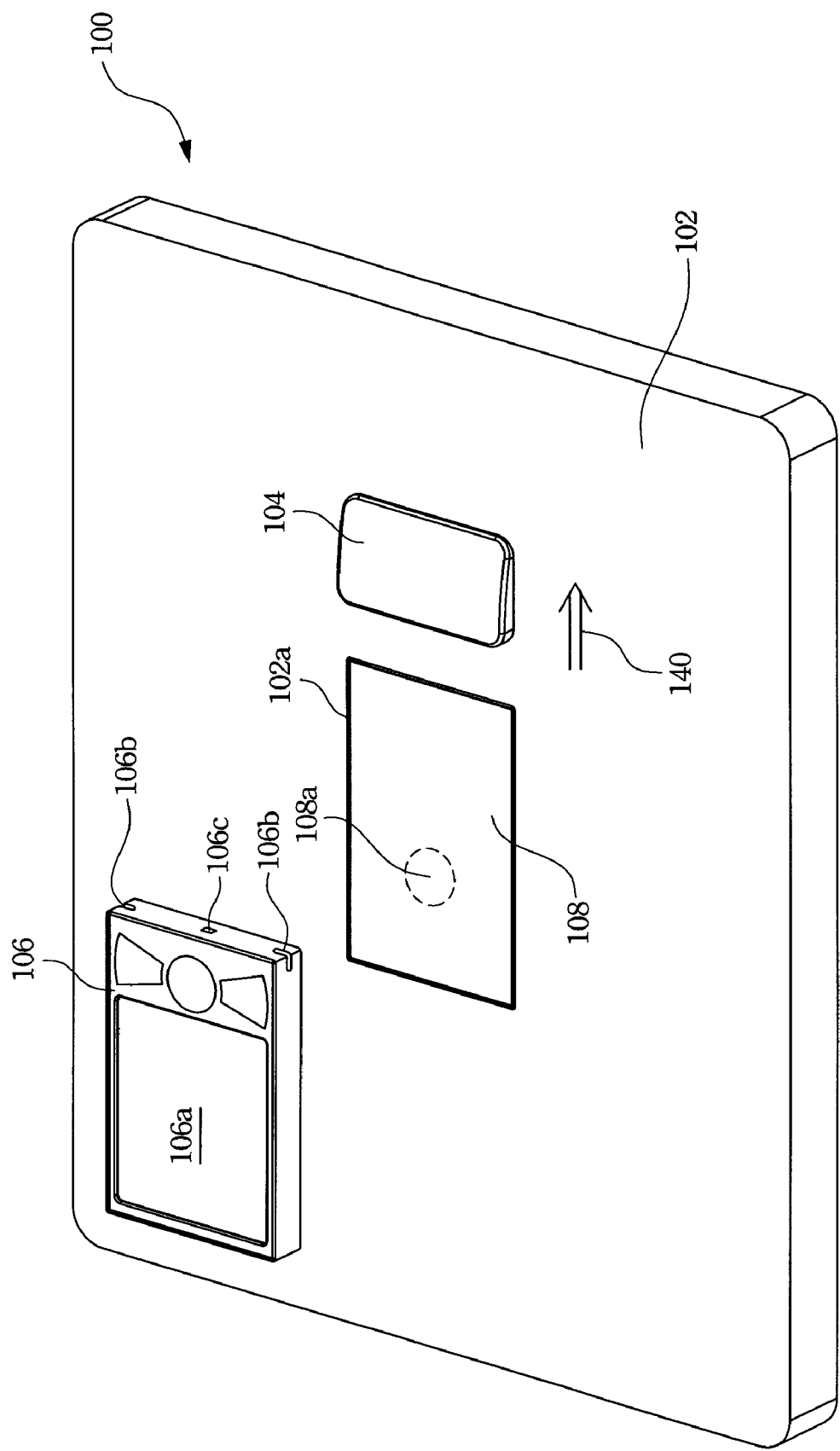
FIG. 2 illustrates a mobile phone detached from the housing board as illustrated in FIG. 1.

FIG. 2 illustrates the mobile phone 106 detached from the housing board as illustrated in FIG. 1. When the control button 104 is moved along the direction 140, a load board 108 is lifted and substantially level with a top surface of the housing board 102 and substantially fitted within an opening 102a. Thus, the mobile phone 106 is lifted out of the housing board 102. The load board 108 is equipped with a magnet 108a to attract the mobile phone 106 so as to prevent the mobile phone 106 from slipping away from the housing board 102 after the mobile phone 106 is lifted out of the housing board 102.

Figure 3:
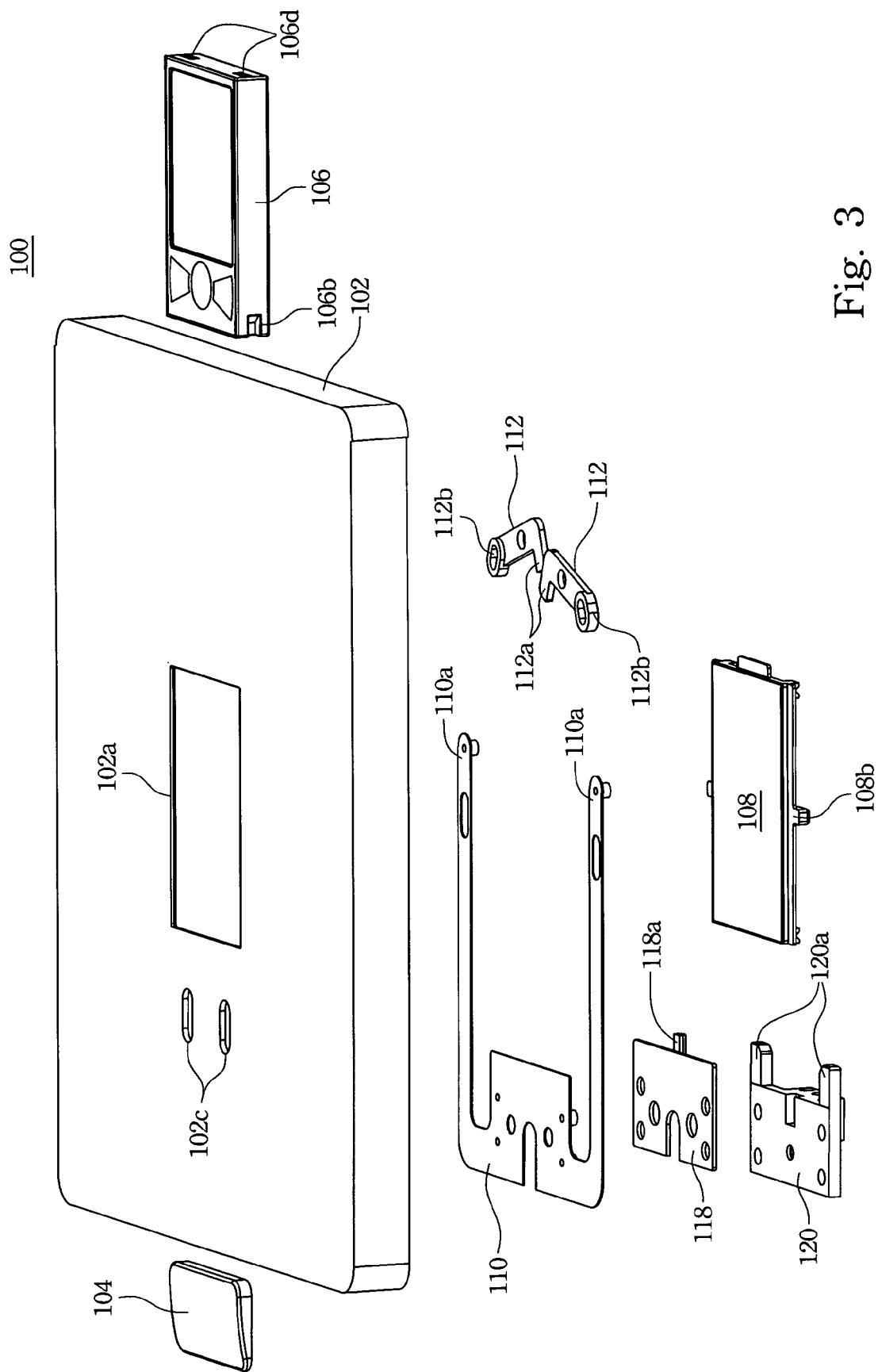
FIG. 3 illustrates an exploded view of the embodiment as illustrated in FIG. 1.
Figure 4:
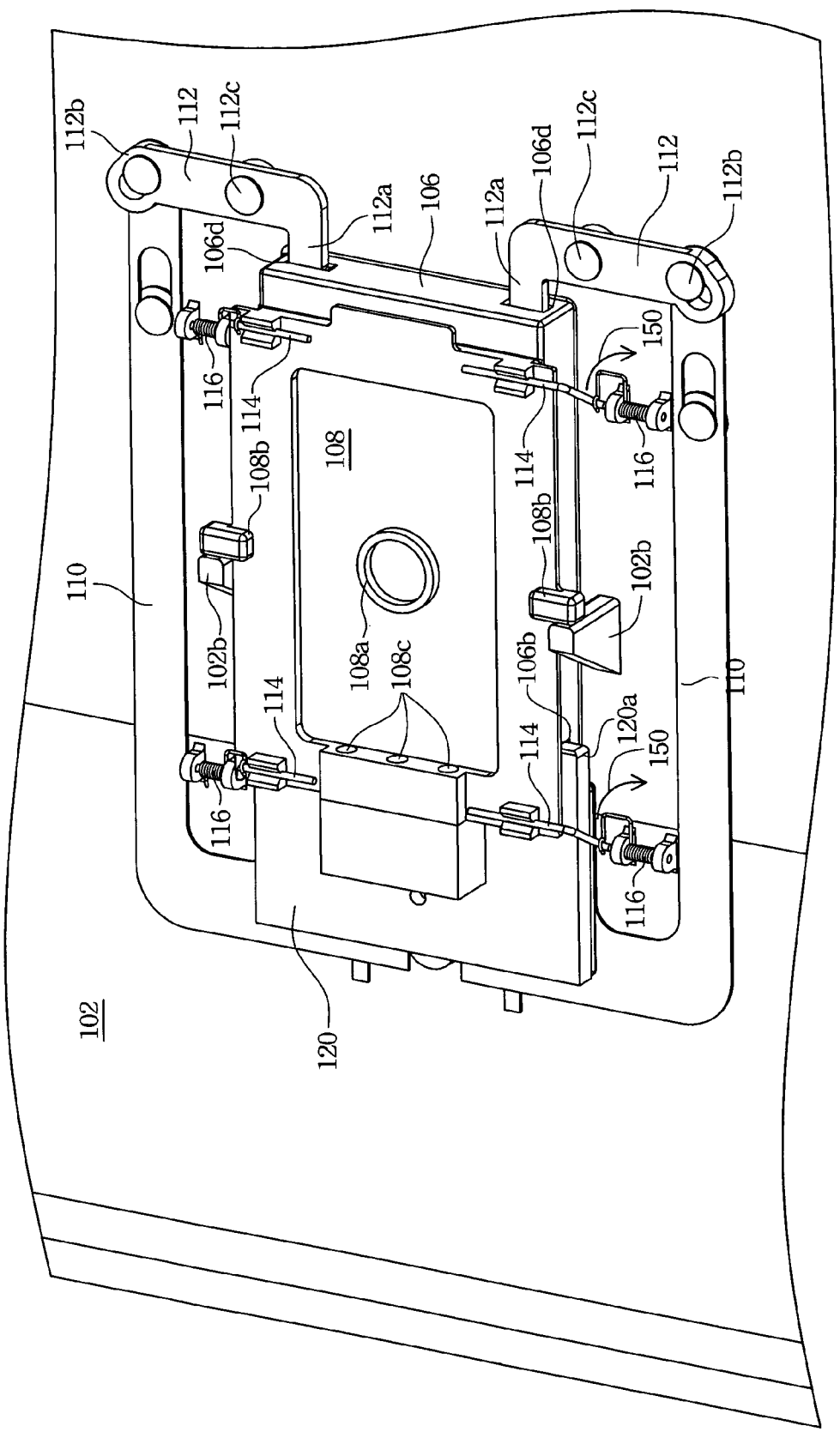
FIG. 4 illustrates a bottom view of the embodiment as illustrated in FIG. 1.
Figure 5:
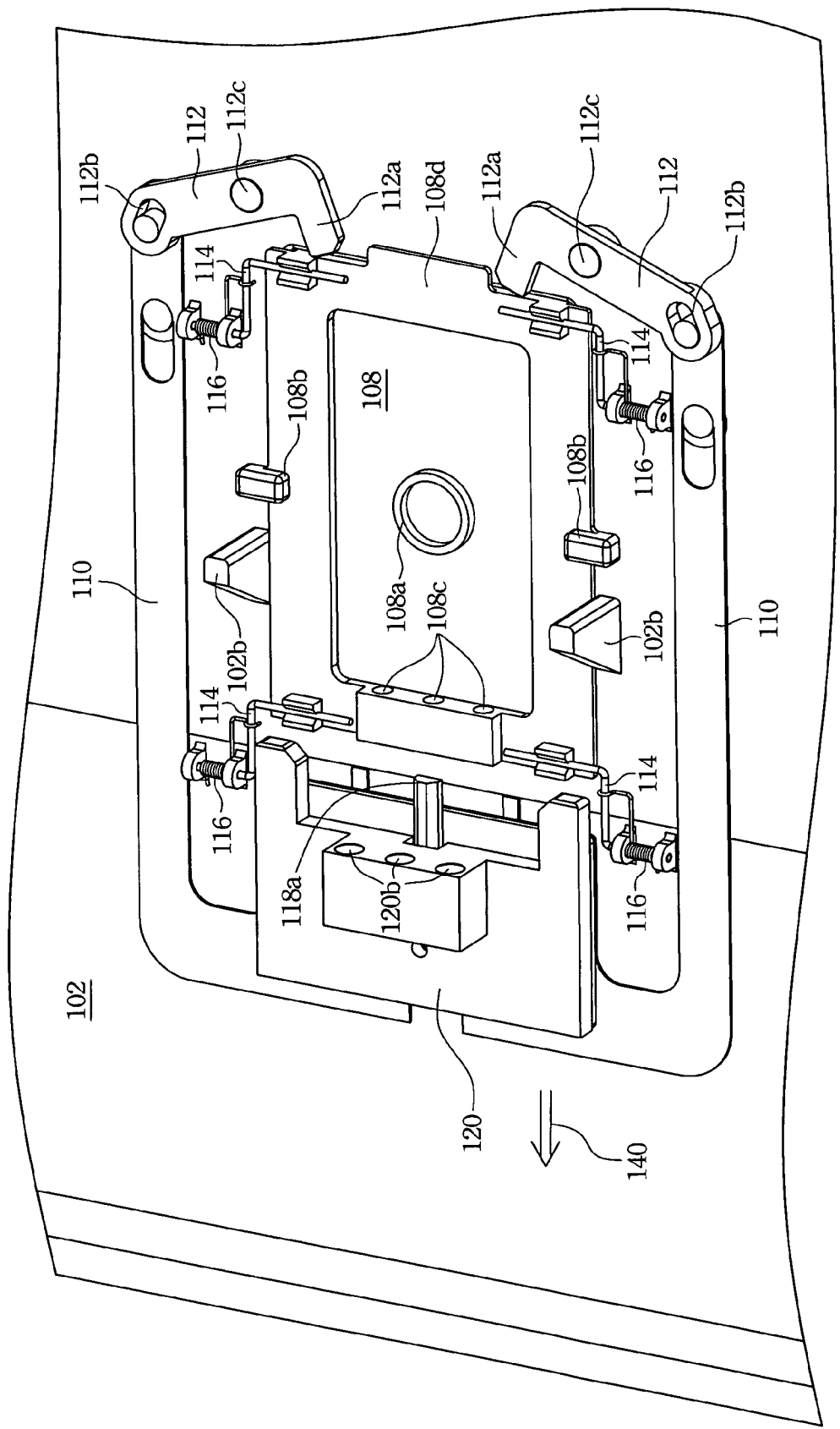
FIG. 5 illustrates a bottom view of the embodiment as illustrated in FIG. 2.

FIG. 3 illustrates an exploded view of the embodiment as illustrated in FIG. 1. In this embodiment, the control button 104 would be installed on a top side of the housing board 102, the other elements are installed on a bottom side of the housing board 102 (as illustrated in FIG. 4 and FIG. 5). The control button 104 is coupled with a substantially M-shaped member 110, a connection member 118 and a securing member 120 via opening 102c. When the substantially M-shaped member 110, the connection member 118 and the securing member 120 are together assembled to the bottom side of the housing board 102, the connection member 118 is sandwiched between the substantially M-shaped member 110 and the securing member 120, and a connection port 118a sticks out (as illustrated in FIG. 5). When the control button 104 is moved along the direction 140, the substantially M-shaped member 110, the connection member 118 and the securing member 120 are moved simultaneously. Two end portions 110a of the substantially M-shaped member 110 are pivotally connected with ends 112b of rotatable members 112 so as to enable opposite hook ends 112a to selectively engage or disengage holes 106d on an edge of the mobile phone 106. The securing member 120 is slid relative to the housing board 102 to enable two fasteners 120a to selectively engage or disengage notches 106b on an opposite edge of the mobile phone 106. At the same time, the connection port 118a of the connection member 118 is electrically connected with the mobile phone 106 to perform the battery charge or other functions.

Referring to FIG. 1 and FIG. 4, wherein FIG. 4 illustrates a bottom view of the embodiment as illustrated in FIG. 1. When the mobile phone 106 is pressed to couple with the housing board 102, the load board 108 is moved simultaneously until magnets 108c of the load board 108 and magnets 120b of the securing member 120 attracts each other (as illustrated in FIG. 5) and a block member 108b of the load board 108 hit a bump member 102b of the housing board 102. At the same time, the hook end 112a of each rotatable member 112 engage the hole 106d of the mobile phone 106 and each fastener 120a engages the notch 106b of the mobile phone 106. The connection port 118a (as illustrated in FIG. 5) also insert into a connection port 106c of the mobile phone 106 (as illustrated in FIG. 2).

Referring FIG. 2 and FIG. 5, wherein FIG. 5 illustrates a bottom view of the embodiment as illustrated in FIG. 2. When the control button 104 is moved along the direction 140, the substantially M-shaped member 110 and the securing member 120 are also moved along the same direction to separate the magnets 108c of the load board 108 and the magnets 120b of the securing member 120. At the same time, the substantially M-shaped member 110 pulls ends 112b of the two rotatable members 112 to enable the hook ends 112a to disengage the holes 106d of the mobile phone 106. In addition, the fasteners 120a disengage the notches 106b of the mobile phone 106 and the connection port 118a is removed from the connection port 106c of the mobile phone 106 (as illustrated in FIG. 2). The load board 108 is then moved towards the housing board 102 by 4 sets of resilient arms. At the same time, the mobile phone 106 is moved out of the housing board 102 by the load board 108 until a block member 108d hit the bottom side of the housing board 102 and the load board 108 is fitted within the opening 102a.

Each set of resilient arm includes a rotation shaft 114 and a torsion spring 116. Two opposite ends of the rotation shaft 114 are pivotally connected with the load board 108 and the bottom side of the housing board 102 respectively. The torsion spring 116 is encircled around the rotation shaft 114 to provide a resilient force to enable the rotation shaft 114 to rotate along a direction 150 (as illustrated in FIG. 4). Thus, the load board 108 is moved to couple with the housing board 102 by the resilient arms. In this embodiment, the load board 108 is substantially in parallel with the housing board 102 when the load board 108 is moved close to or away from the housing board 102.

The substantially M-shaped member 110 is slidably connected with the bottom side of the housing board 102 and is slid along a plane that is substantially parallel with the bottom side of the housing board 102. The rotatable members 112 are pivotally connected with the bottom side of the housing board 102 with joints 112c. When the substantially M-shaped 110 member is slid relative to the housing board 102, the rotatable members 112 are simultaneously carried to rotate such that the hook ends 112a of the rotatable members 112 selectively engage or disengage the holes 106d of the mobile phone 106.

In discussed embodiments, a detachable connection mechanism is provided to properly establish an electrical connection between a mobile phone and a notebook computer. Moreover, the detachable connection mechanism provides a proper structure to fill the concave section of a housing board after the mobile phone is removed from the housing board of the notebook computer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A detachable connection mechanism, comprising:
   a notebook computer having a housing board with an opening;
   a load board, having a first magnet and pivotally connected to a side of the housing board, the load board being substantially in parallel with the housing board when the load board is moved close to or away from the housing board, the load board being substantially fitted within the opening when the load board is moved to couple with the housing board;
   a mobile phone being attached to the load board by a magnetic attraction of the first magnet;
   two rotatable members, pivotally connected with the side of the housing board;
   a substantially M-shaped member, slidably connected with the side of the housing board, and pivotally connected an end of each rotatable member, the substantially M-shaped member being slid relative to the housing board to enable an opposite end of each rotatable member to selectively engage or disengage an edge of the mobile phone;
   a securing member, coupled with the substantially M-shaped member and being simultaneously slid relative to the housing board to selectively engage or disengage an opposite edge of the mobile phone; and
   a plurality of resilient arms, pivotally connected with the side of the housing board at an end, and pivotally connected with the load board at an opposite end,
   when the securing member disengages the opposite edge of the mobile phone, the substantially M-shaped member is simultaneously slid to enable the opposite end of each rotatable member to disengage the edge of the mobile phone, and the load board is moved by the plurality of resilient arms to couple with the housing board.

2. The detachable connection mechanism of claim 1, further comprising a control button disposed on an opposite side of the housing board and coupled with the substantially M-shaped member across the housing board.

3. The detachable connection mechanism of claim 1, wherein the securing member comprises a fastener to engage the opposite edge of the mobile phone.

4. The detachable connection mechanism of claim 3, wherein the securing member comprises a second magnet, and the load board comprises a third magnet, when the mobile phone and the load board are pressed to move through the opening of the housing board, a magnetic attraction between the second magnet and the third magnet enables the fastener to engage the opposite edge of the mobile phone.

5. The detachable connection mechanism of claim 4, wherein the opposite edge of the mobile phone comprises a notch for the fastener to engage.

6. The detachable connection mechanism of claim 4, wherein when the mobile phone and the load board are pressed to move through the opening of the housing board, the magnetic attraction between the second magnet and the third magnet also enables the substantially M-shaped member to slide relative to the housing board such that the opposite end of each rotatable member engages the edge of the mobile phone.

7. The detachable connection mechanism of claim 6, wherein the edge of the mobile phone comprises two holes for the two rotatable members to respectively engage.

8. The detachable connection mechanism of claim 1, further comprises a connection member disposed between the substantially M-shaped member and the securing member, the connection member having a connection port to electrically connect with the mobile phone.

9. The detachable connection mechanism of claim 1, wherein the housing board comprises a bump member disposed around the opening, and the load board comprises a block member, when the mobile phone and the load board are pressed to move through the opening of the housing board, the bump member stops the block member to prevent the load board from moving.

10. A detachable connection mechanism for coupling a first electronic device with a second electronic device, the first electronic device having a housing board with an opening, the detachable connection mechanism comprising:
    a load board, being substantially fitted within the opening when the load board is moved to couple with the housing board;
    two rotatable members, pivotally connected with a side of the housing board;
    a substantially M-shaped member, slidably connected with the side of the housing board, and pivotally connected an end of each rotatable member, the substantially M-shaped member being slid relative to the housing board to enable an opposite end of each rotatable member to selectively engage or disengage an edge of the second electronic device;
    a securing member, coupled with the substantially M-shaped member and being simultaneously slid relative to the housing board to selectively engage or disengage an opposite edge of the second electronic device; and
    a plurality of resilient arms, pivotally connected with the side of the housing board at an end, and pivotally connected with the load board at an opposite end, when the securing member disengages the opposite edge of the second electronic device, the substantially M-shaped member is simultaneously slid to enable the opposite end of each rotatable member to disengage the edge of the second electronic device, and the load board is moved by the plurality of resilient arms to couple with the housing board.

11. The detachable connection mechanism of claim 10, wherein the first electronic device is a notebook computer.

12. The detachable connection mechanism of claim 10, wherein the second electronic device is a mobile phone.

13. The detachable connection mechanism of claim 10, wherein the load board has a first magnet and is pivotally connected to the side of the housing board.

14. The detachable connection mechanism of claim 10, further comprising a control button disposed on an opposite side of the housing board and coupled with the substantially M-shaped member across the housing board.

15. The detachable connection mechanism of claim 10, wherein the securing member comprises a fastener to engage an opposite edge of the second electronic device.

16. The detachable connection mechanism of claim 15, wherein the securing member comprises a first magnet, and the load board comprises a second magnet, when the second electronic device and the load board are pressed to move through the opening of the housing board, a magnetic attraction between the first magnet and the second magnet enables the fastener to engage the opposite edge of the second electronic device.

17. The detachable connection mechanism of claim 16, wherein the opposite edge of the second electronic device comprises a notch for the fastener to engage.

18. The detachable connection mechanism of claim 16, wherein when the second electronic device and the load board are pressed to move through the opening of the housing board, the magnetic attraction between the first magnet and the second magnet also enables the substantially M-shaped member to slide relative to the housing board such that the opposite end of each rotatable member engages the edge of the second electronic device.

19. The detachable connection mechanism of claim 10, further comprises a connection member disposed between the substantially M-shaped member and the securing member, the connection member having a connection port to electrically connect with the second electronic device.

20. The detachable connection mechanism of claim 10, wherein the housing board comprises a bump member disposed around the opening, and the load board comprises a block member, when the second electronic device and the load board are pressed to move through the opening of the housing board, the bump member stops the block member to prevent the load board from moving.

* * * * *